United States Patent [19]
Good

[11] 3,846,959
[45] Nov. 12, 1974

[54] BULK-LOADING APPARATUS

[75] Inventor: Paul F. Good, Lutherville, Md.

[73] Assignee: Speedco, Inc., Baltimore, Md.

[22] Filed: May 30, 1973

[21] Appl. No.: 365,233

[52] U.S. Cl.......................... 53/61, 53/157, 53/164, 53/252, 53/248
[51] Int. Cl....................... B65b 57/10, B65b 35/44
[58] Field of Search....... 53/61, 157, 162, 164, 167, 53/202, 252, 258, 248

[56] References Cited
UNITED STATES PATENTS
2,909,016   10/1959   Sherrill ................................... 53/61
3,001,344   9/1961    Morton et al...................... 53/157 X Primary Examiner—Travis S. McGehee
Attorney, Agent, or Firm—Finnegan, Henderson, Farabow & Garrett

[57] ABSTRACT

A bulk loader is provided for receiving sausages from the upper reach of a sausage conveyor which conveys sausages with the sausages parallel to each other and with their ends substantially aligned, and loading the sausages received from the sausage conveyor into a container. The bulk loader comprises support means for supporting a group of sausages, and feeder means for advancing groups of sausages onto the support means. The feeder means includes an endless conveyor synchronized with the sausage conveyor. Stripping means are provided for intermittently moving a group of sausages from the support means into the container. A container support means is provided that preferably includes conveyor means for removing the container from the bulk loader when a predetermined number of sausages has been loaded into the container. Desirably, the bulk loader includes means for interleaving sheets of paper between layers of sausages deposited in the container.

21 Claims, 14 Drawing Figures

BULK-LOADING APPARATUS

FIELD OF THE INVENTION

This invention relates to packaging machines. More particularly, the invention is directed to machines for packaging objects such as frankfurters, in containers. While the invention will be described with reference to specific embodiments for packaging frankfurters, those skilled in the art will appreciate that certain of the subcombinations disclosed and claimed have utility in packaging a wide variety of objects.

BACKGROUND OF THE INVENTION

An important part of many frankfurter packaging operations is bulk loading. For example, schools and other institutions require that frankfurters be packaged in large quantities, for example 80 to 100 frankfurters per carton. This bulk loading contrasts with the usual vacuum packaging of frankfurters in 1 or 2 pound packages for sales to individual consumers through various retail outlets.

Prior to the present invention, in bulk loading frankfurters, it was necessary to use an independent, space-consuming bulk loading machine, or to hand package the franfurters in bulk. The use of an independent loading machine has required valuable floor space and an independent machine is often under-utilized to the point of unprofitability.

There has existed a need for a bulk loader that can be used in conjunction with regular vacuum packaging equipment; that permits switching from regular packaging to bulk loading in a very short time; and that operates at the high speed, up to 800 franks per minute, that refined vacuum package systems are capable of attaining.

Further, there has been a need for a device which will interleave paper liners between layers of franks packed in bulk in a container. The paper liners are desirable to separate layers of bulk-packed franks because the liners absorb excess moisture from the franks and keep the layers of franks from freezing together in circumstances where the bulk package of frankfurters is frozen. Further, the use of paper liners between layers, facilitates counting and is a convenience to the person who removes the franks from the carton.

BRIEF DESCRIPTION OF THE INVENTION

In one form, the invention provides a bulk loader for packaging a plurality of sausages in a container. The bulk loader comprises support means for supporting a group of sausages; container support means, located below the support means, for supporting the container, feeder means for advancing groups of sausages onto the support means; and stripping means mounted for stripping movement relative to the support means for intermittently moving a group of sausages from the support means into the container.

Preferably, the container support means includes conveyor means for removing the container from the bulk loader when a predetermined number of sausages has been loaded into the container.

It is also preferred that the feeder means continuously move sausages along a given path and that the path of movement of the stripping means intersects the given path. In this preferred form, the stripping means includes a stripping head mounted for reciprocation relative to the support means; and the stripping head includes a forward portion adjacent the feeder means that can be deflected out of the given path by advancing sausages.

It is also preferred that the support means comprise a plurality of pivotally mounted gates, and deflectable means connected to said gates for permitting said gates to open due to the pressure exerted on the gates through a group of sausages by the stripping means. The deflectable means are selected to be resilient for closing the gates at the end of a stripping operation.

The conveyor means desirably supports the container in a loading position in which the gates contact the side walls of the carton during the stripping operation and thereby hold the sides of the container open during stripping of sausages into the container.

The carton support means preferably includes an elevator means for elevating the container into the loading position. Such an elevator means desirably includes a carton support element and a control means for positioning the carton support element in an intermediate position in which the top layer of sausages deposited in the carton are at a low enough elevation to permit the gates to pivot to their closed position without contacting the top layer of sausages.

The invention also provides apparatus for supplying successive discrete lengths of paper to a given location which in the preferred embodiment of the invention is adjacent the top of a carton in the loading position of the above-described bulk loader. This apparatus includes shearing means for cutting a web of paper into discrete lengths. The shearing means includes a cylinder containing a slot that permits passage of the web of paper therethrough. One edge of said slot forms a cutting edge. A spring-loaded shearing bar is held in frictional contact with the exterior surface of the cylinder.

Drive means are provided for intermittently oscillating the cylinder from an original position in which the slot is aligned with the web of paper fed by the supply means (a) through an arc that permits the cutting edge and the shearing bar to shear the web of paper, and (b) through an arc back to its original aligned position.

Supply means feed a web of paper to the shearing means; and paper outfeed means are provided for feeding discrete lengths of paper from the shearing means to the given location.

Preferably, the apparatus for supplying discrete lengths of paper includes a supply means that continuously feeds a web of paper to the shearing means. The supply means includes a take-up chamber having a convex surface on one side of the web that forms a path for the web when the slot is aligned with the web, and a concave surface on the other side of the web that forms a restraining path for the web when the slot is out of alignment with the web. The concave surface guides the web into the slot after the slot returns to its original aligned position. Also, the paper outfeed means moves the paper at a faster linear rate of speed than the supply means, and thus takes up the slack in the web produced during the time period the slot is out of alignment with the web.

Figure 1:
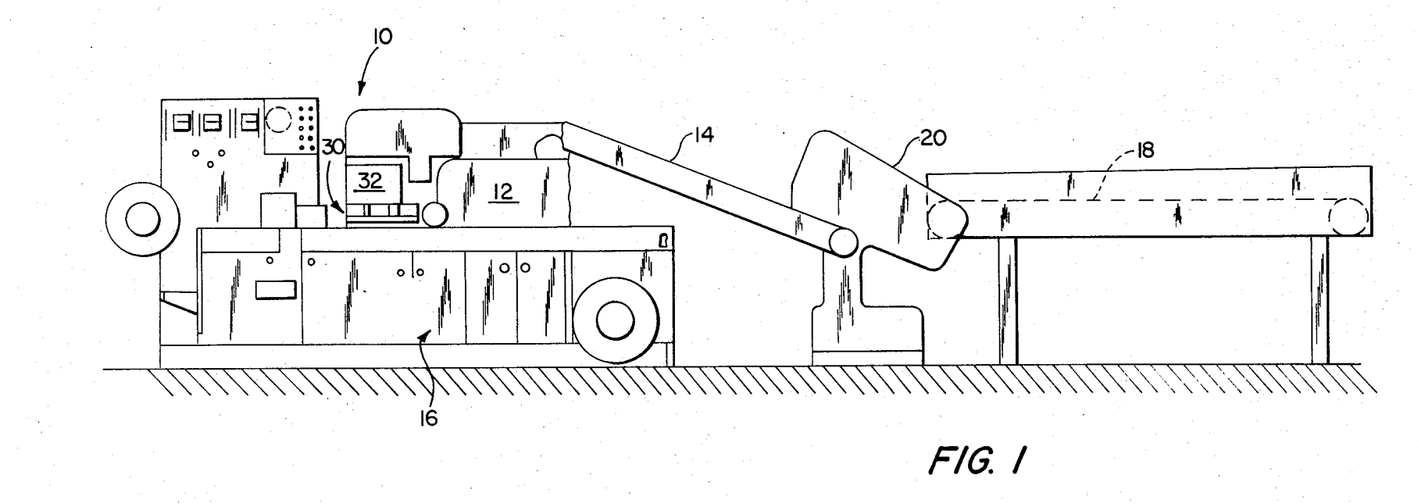
FIG. 1 is a schematic elevation view that illustrates a bulk loader of this invention installed for use with a high-speed vacuum packaging system.

The new automatic bulk loader of this invention can be integrated with a vacuum packaging system for frankfurters such as schematically illustrated in FIG. 1. The invention permits the user to switch from regular packaging to bulk loading in seconds, provides maximum equipment utilization, and generally improves operational efficiency. The bulk loader permits a large reduction in the number of personnel required for bulk loading compared to manual loading, and thus increases profitability.

The present invention is compatible with a high-speed vacuum packing system for frankfurters, and is capable of loading up to 800 franks per minute.

A major advantage of the present bulk loader is that it can include means for interleaving paper liners between the layers of frankfurters. The paper liners absorb excess moisture, keep layers of frankfurters from freezing together, and facilitate counting of the frankfurters.

The bulk loader of this invention can pack sausages or other objects in a number of configurations. Rows of 10, 12, and 16 frankfurters can be programmed to be deposited in each layer of franks. A preferred embodiment can simultaneously load single rows into two cartons, or double up and load two rows of frankfurters into one larger carton.

The loading operation is virtually all automatic. Sausages or other objects are delivered to the loader, are moved into the loading position, and are conveyed to the stripping area. Here they are layered with paper and stripped into the carton. Meanwhile, cartons are automatically moved into loading position, loaded, and then conveyed to the shipping area. Preferably, the loader and conveyor are pivotally mounted on the main frame of the feeder head of a vacuum packaging apparatus so that they can swing away when the user desires to vacuum package. The entire unit is designed for long life with a minimum of service.

DETAILED DESCRIPTION OF PREFERRED EMBODIMENTS OF THE INVENTION

With reference to FIG. 1, a bulk loader, generally 10, is illustrated that is pivotally mounted on the feeding head 12 of a commercially available vacuum packaging system for frankfurters. Bulk loader 10, as explained in more detail below, can be pivoted between an operative position in which it intercepts frankfurters being advanced by feeder head 12, and an inoperative position in which it does not intercept the frankfurters, and instead permits frankfurters to pass downwardly from feeding head 12 into the vacuum packaging apparatus generally 16.

The other elements of the vacuum packaging system illustrated in FIG. 1, include a storage conveyor 18, and a collator 20 that feeds a precise number of aligned frankfurters to inspection conveyor 14. The frankfurters are aligned by collator 20 into one or more columns, with each frank in each column being aligned in parallel with the axis of each frank being transverse to its direction of movement on inspection conveyor 14. The ends of the franks are substantially aligned in planes parallel to the direction of travel of conveyor 14, and continue to be moved in this relationship in feeding head 12.

Figure 2:
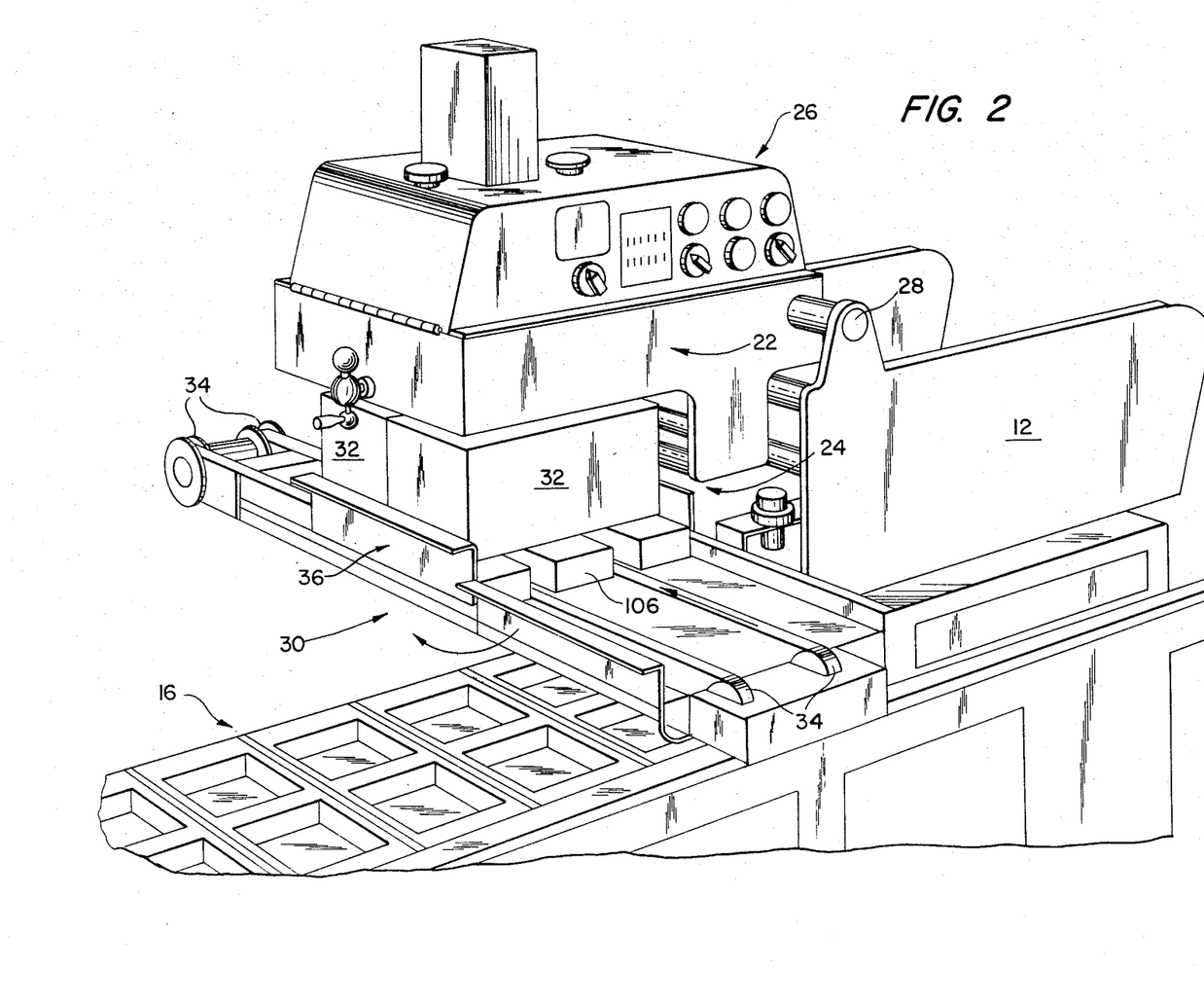
FIG. 2 is a schematic perspective view of a preferred embodiment of the bulk loader of this invention.

FIG. 2 schematically illustrates the major subassemblies of a presently preferred embodiment of the bulk loader of this invention, including a feeding and stripping assembly generally 22 that moves franfurters into a container 32, a paper feed assembly generally 24 that supplies sheets of paper for interleaving, and a control assembly generally 26. Each of assemblies 22, 24, and 26 is connected to a frame that is pivotally mounted on shaft 28, with shaft 28 being supported by the frame of feeding head 12 of the vacuum packaging system.

Also illustrated in FIG. 2 is a container support means, generally 30, that includes conveyor means for moving a pair of containers into and out of the loading position. A pair of paperboard cartons 32 are illustrated in the loading position beneath stripping assembly 22 in FIG. 2. Each carton 32 receives franks from a separate line of advancing franks. Container support means 30 includes a pair of spaced endless belt conveyor 34, and elevator means generally 36 for raising and lowering the carton during the loading cycle for each carton.

Container support means 30 is pivotally mounted on feeding head 12 of the vacuum packaging system. This pivotal mounting arrangement permits movement of container support means 30 through a horizontal clockwise arc of travel from the position illustrated in FIG. 2 to a stowed position that allows easy access to the loading station of the vacuum packaging equipment.

Figure 4:
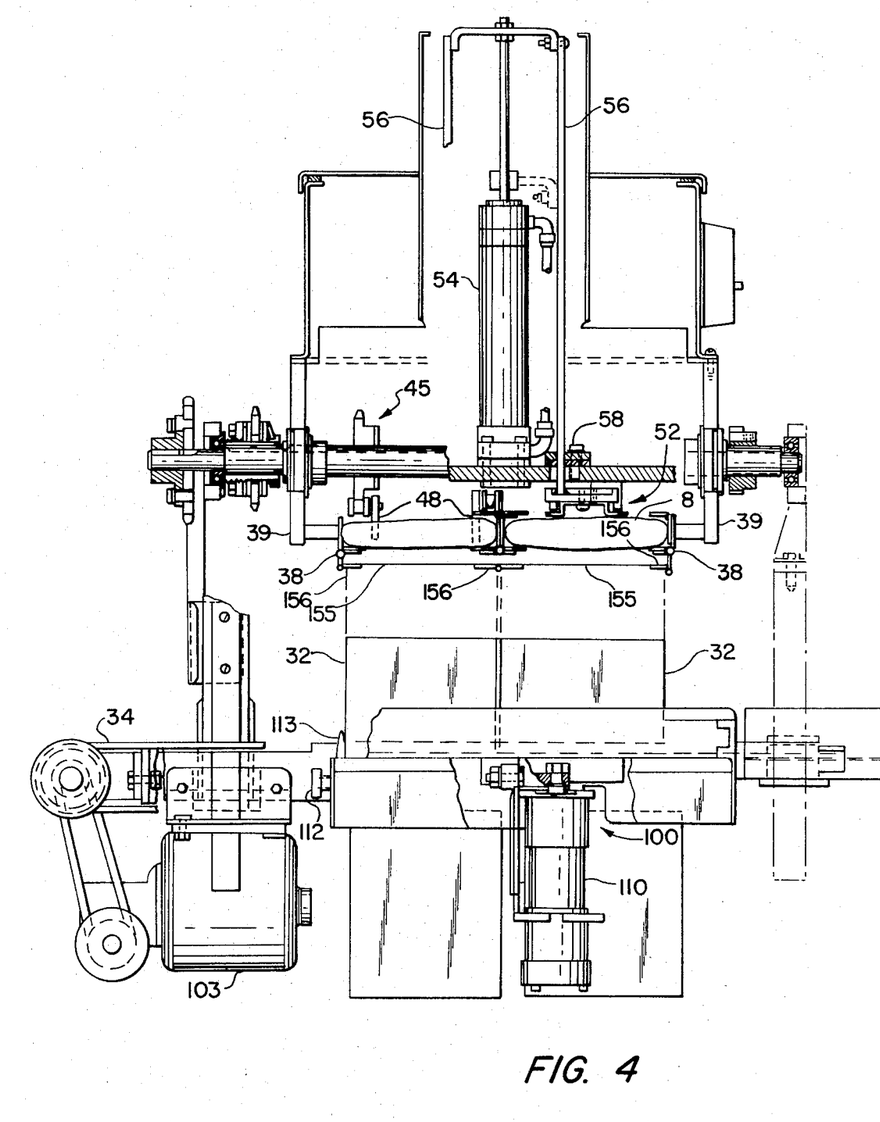
FIG. 4 is an end elevation view of the bulk loader of FIG. 3 with certain parts removed for ease of viewing.

In accordance with the invention support means are provided for supporting a group of sausages in a position from which the group of sausages is tripped into the container. As here embodied and as illustrated in FIG. 4, the support means includes a plurality of pivotally mounted spring-loaded gates 38.

The spring-loaded gates 38 are ordinarily held in a closed horizontal position. Gates 38 can be opened, that is, moved to a vertical position due to downward pressure exerted on the gates by a group of sausages being pressed downwardly by the stripping means. The springs in gates 38 are deflectable resilient members that close the gates, that is, return the gates to the horizontal position illustrated in FIG. 4, after completion of the stripping operation. Gates 38 are connected to the frame of the bulk loader by arms 39 illustrated in FIG. 4.

In accordance with the invention, feeder means are provided for advancing groups of sausages onto the support means. In preferred embodiments, the feeder means comprises an endless conveyor that is synchronized with a sausage conveyor that supplies sausages to the bulk loader. The endless conveyor desirably has a plurality of laterally aligned and laterally spaced fingers projecting outwardly therefrom.

Figure 3:
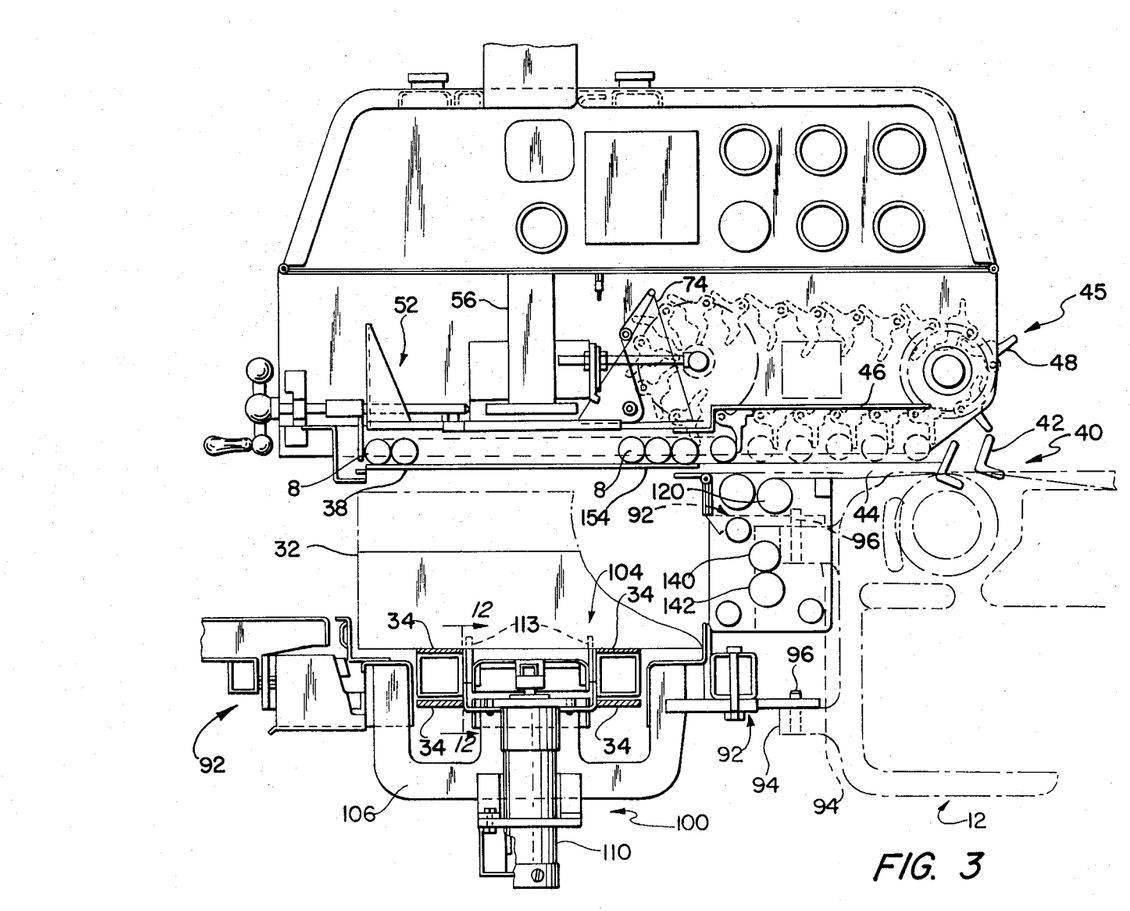
FIG. 3 is a side elevation view of the bulk loader of FIG. 2, with certain parts removed for ease of viewing.

In the presently preferred embodiment illustrated in FIG. 3, frankfurters are supplied to the feeding means by an endless conveyor, generally 40, including a plurality of outwardly extending fingers 42. Conveyor 40 forms part of the feeding head 12 of a vacuum packing system.

The feeding means illustrated in FIG. 3 includes a plurality of cantilevered arms 44 and an endless overhead conveyor generally 45. Cantilevered arms 44 are mounted on the main frame of the bulk loader and project beneath the straight line extension of the path formed by the upper reach of conveyor 40 to permit transfer of frankfurters from conveyor 40 of head 12 to the overhead conveyor 45. The franks are then conveyed to a loading position by the lower reach of conveyor 45. Conveyor 45 is an endless chain conveyor including four endless chains having fixed thereon laterally aligned and laterally spaced fingers 48 which contact franks and push them to the left along the top of arms 44 and onto gates 38 as illustrated in FIG. 3. The heel of fingers 48 rest against a hold-down bar 46 to prevent further counterclockwise rotation of fingers 48 and permit fingers 48 to push the franks to the left as viewed in FIG. 3.

Overhead conveyor 45 must by synchronized with conveyor 40 so that the tips of fingers 48 and fingers 42, respectively, are substantially aligned near the projecting end of cantilevered arms 44 to effect transfer of each frank from conveyor 40 to conveyor 45. This synchronization is desirably achieved by having the drive train of conveyor 40 also drive conveyor 45, both when the bulk loader is in the operative and inoperative position.

In accordance with the invention, stripping means are provided for intermittently moving a group of sausages from the support means into the container after a predetermined number of sausages are collected on the support means. As here embodied, the stripping means comprises two stripping heads 52 mounted for vertical reciprocation relative to gates 38. Only one stripping head 52, the right side stripping head, is illustrated in FIG. 4 so that the left portion of conveyor 45 and attached fingers 48 can be more clearly illustrated. Each stripping head 52 is attached to an air cylinder 54 by a connecting bar 56 and thus reciprocates in response to movement of air cylinder 54. A pair of guide blocks 58, only one is shown in FIG. 4, are provided to guide connecting bars 56 and thus guide the vertical reciprocating movement of the stripping heads 52. Guide blocks 58 and the stationary cylinder of air cylinder 54 are mounted on the main frame of the bulk loader.

Figure 5:
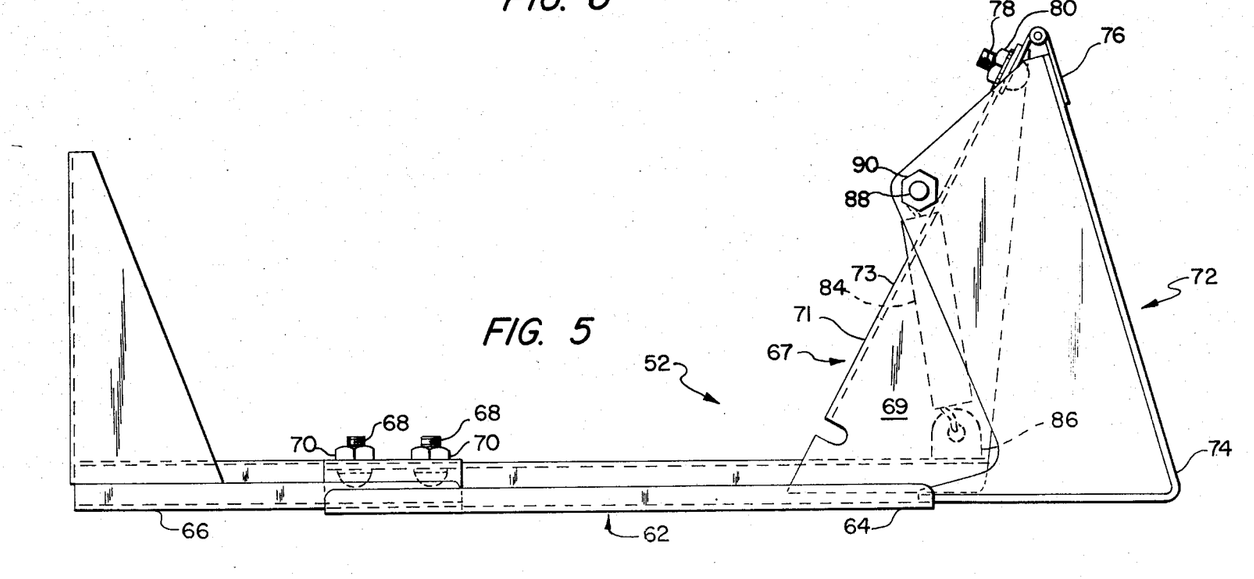
FIG. 5 is an elevation view of the stripper assembly utilized in the bulk loader of FIGS. 2–4.
Figure 6:
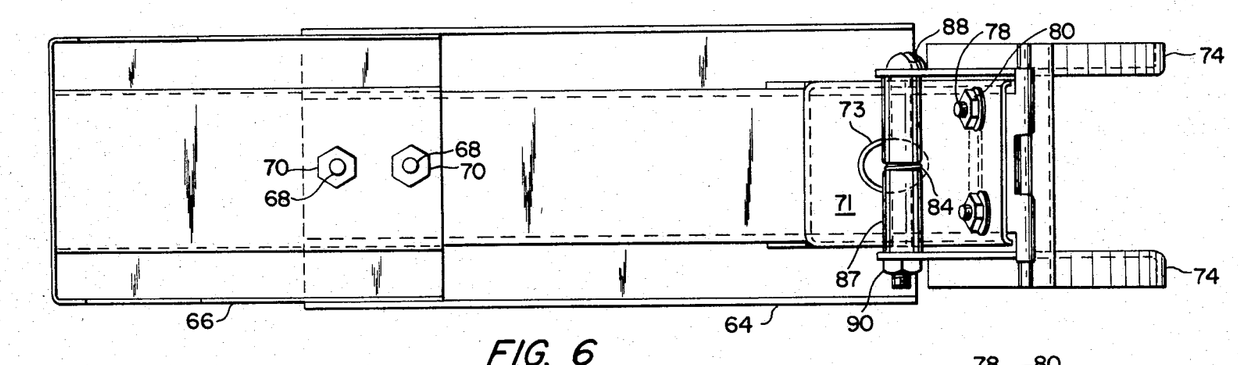
FIG. 6 is a plan view of the stripper assembly of FIG. 5.

As illustrated in FIGS. 5 and 6, stripping heads 52 each include a stripper plate generally 62 formed by a plate member 64 and a removable plate member 66 secured together by two threaded bolts 68 and two nuts 70, so that removable plate members 66 of various lengths can be installed to accommodate various length containers 32. Plate member 64 has affixed thereto, for example by welding, a bracket member generally 67 having triangularly shaped arms 69 connected together by web 71. Slot 73 and a pair of circular openings are provided in web 71 for reasons described below.

Stripper plate generally 62 further includes a front assembly generally 72 adjacent conveyor 45 that forms the forward portion of stripper plate 62 and can be deflected out of the path of advance of sausages as they move along the top of cantilevered arms 44 and then across the top of gates 38. Front assembly 72 includes a pair of pivotally mounted brackets generally 74 and a resilient hinge 76. Hinge 76 interconnects brackets 74 and web 71 of bracket 67 mounted on plate member 64, and is welded to brackets 74 and attached to web 71 by a pair of threaded bolts 78 that pass through circular bolt openings (not shown) in web 71 and nuts 80. The resilience of hinge 76 permits infed sausages to deflect brackets 74 to the left as viewed in FIGS. 3 and 5.

A tension spring 84, shown in FIG. 5, interconnects (a) a clip 86 welded on plate member 64 and (b) a grooved spacer 87. A bolt 88 and nut 90 clamp brackets 74 tightly against the ends of spacer 87. Spring 84 assists in returning brackets 74 to the position shown in FIGS. 3 and 5 after brackets 74 have been deflected to the left by an incoming sausage being advanced by conveyor 45.

Container support means 30 are provided for supporting the container in a loading position, and removing the container from the bulk loader when a predetermined number of sausages has been loaded into the container. Preferably, the support means includes a conveyor means that automatically moves empty containers into the loading position, and includes an elevator means that changes the elevation of the container during the loading cycle by gradually lowering the container during the loading of the top layer of sausages.

Preferably and as illustrated in FIG. 3, the container support means includes a frame assembly generally 92. Frame assembly 92 is supported by three vertically aligned and vertically spaced brackets 94 that are attached to and protrude from the main frame of feeding head 12. Two brackets 94 are illustrated in FIG. 3, and another bracket is located directly behind the lower of the two illustrated brackets. A vertically extending circular opening extends from the top to the bottom of each bracket 94 that permits insertion of a removable pin 95 in the lower illustrated bracket and a pin 96 in each of the far side brackets 94. Removal of pin 95 from lower bracket 94 permits pivoting frame assembly 92 about rear pins 96, and movement of the container conveyor in a 90° clockwise arc from the position of FIG. 2, to facilitate access to the feeder head of the vacuum packaging apparatus.

As illustrated in FIGS. 3 and 4, a preferred embodiment of the container support means includes an elevator means generally 100, a pair of container conveyors 34, and container stop means 104 for preventing movement of an unloaded container on the container conveyors 34.

Container conveyors 34 are driven continuously during a bulk-loading operation by an electric motor 103 mounted on frame assembly 92.

Elevator means 100, as illustrated in FIG. 3, includes a support element 106 and control means for raising and lowering support element 106. Support element 106 begins its downward movement prior to completion of the loading of the top layer of sausages in the container 32. Support element 106 is an ω-shaped member that presents a discontinuous upper support surface. The elevation of support element 106 can be changed because it is mounted on the movable piston of a pneumatic cylinder 110. One end of cylinder 110 is rigidly mounted on frame assembly 92.

An air pressure metering valve controls the slow lowering of the piston cylinder 110 by metering the cylinder exhaust air as the piston moves downwardly.

Support element 106 is slowly lowered from an upper elevation which permits gates 38 to contact the side walls of containers 32 when gates 38 are vertical through an intermediate elevation that permits gates 38 to clear the last layer of franks loaded into the container. The downward movement of support element 106 continues down to a low elevation in which the top of support element 106 lies below the plane of the upper reach of conveyors 34. During the loading of the top layer of sausages, support element 106 starts to lower slowly just before the stripping stroke of stripping head 51 begins, so that support element 106 has lowered about one inch at the time the top layer of franks is deposited in the container.

FIG. 3 shows support element 106 at the low elevation that permits conveyors 34 to support the container. The phantom lines in FIGS. 3 and 4 illustrate the position of container 32 when support element 106 is in its upper position.

The container support means also preferably includes a resilient container stop means connected to the container support element 106. The stop means project above the plane of the upper reach of the endless conveyor to stop an empty container as it moves into the loading position on the endless conveyor, and thus assure that the container is positioned for receiving franks stripped from the support means.

Figure 12:
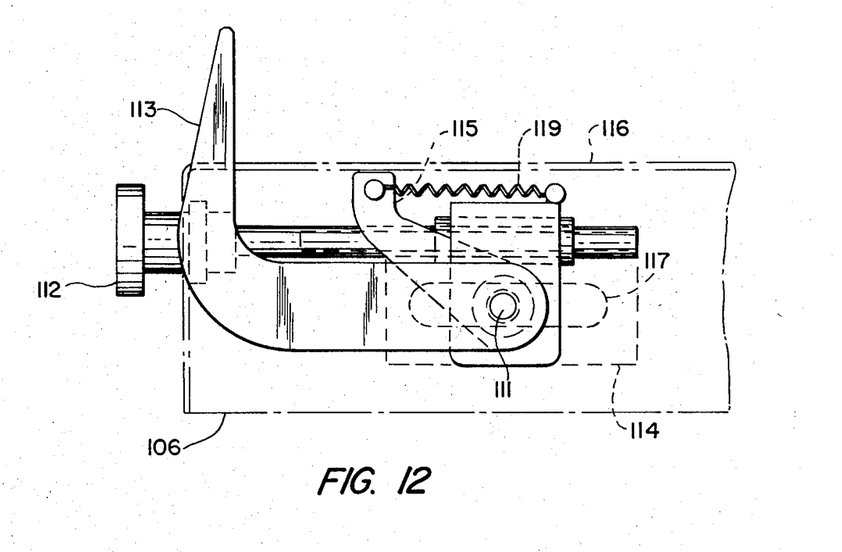
FIG. 12 is an enlarged elevation view of the container stop means taken along plane 12—12 of FIG. 3.
Figure 13:
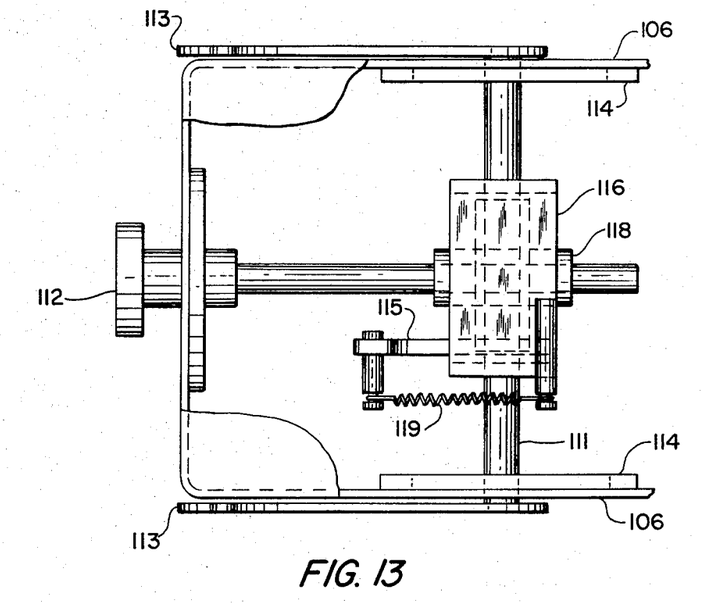
FIG. 13 is a plan view of the container stop means illustrated in FIG. 12 with most of the top cover of the stop means removed for ease of viewing.

In the embodiment of the resilient stop means illustrated in FIGS. 12 and 13, an adjusting screw 112 is rotatably mounted on support element 106. A pair of slotted plates 114 are fixed to support element 106. A bracket assembly 116 includes a threaded housing 118 that engages the threaded portion of adjusting screw 112 to permit varying the linear position of bracket assembly 116 along the slot 117 of slotted plates 114.

A shaft 111 is rotatably mounted on bracket assembly 116. A pair of stop arms 113 and a resisting arm 115 are each mounted on shaft 111 for rotation therewith. A tension spring 119 has one end mounted on bracket assembly 116 and the other end attached to resisting arm 115. Thus, a moment arm is exerted on shaft 111 by tension spring 119 that resists a counterclockwise pivotal movement of stop arms 113.

The position adjustability of bracket assembly 116, which in turn adjusts the position of stop arms 113 permits adjustments to stop various width containers in proper loading position. The spring 119 provides enough force to stop empty containers as they are being conveyed on conveyor belts 34, but not enough force to hold filled containers when they are lowered onto the conveyor belts 34.

The invention also provides an apparatus for supplying discrete lengths of paper to a given location, for example, over the top of a container being loaded with frankfurters.

Figure 7:
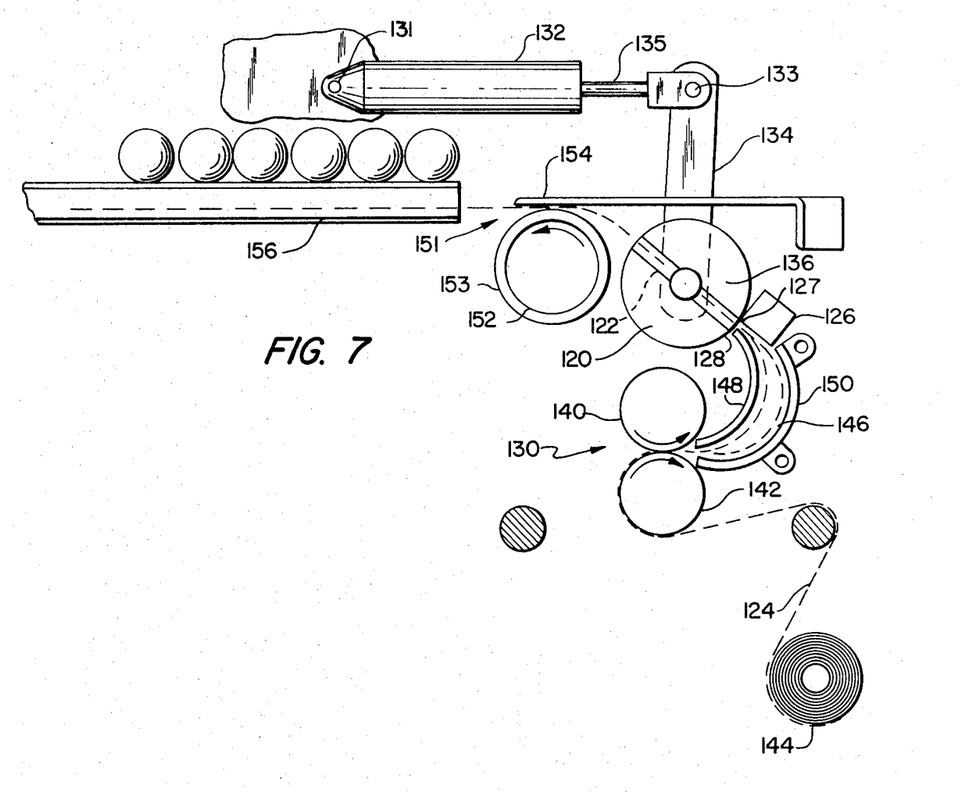
FIG. 7 is a schematic view of the paper feed assembly used in conjunction with the bulk loader of FIGS. 2–4.
Figures 9, 10, 11:
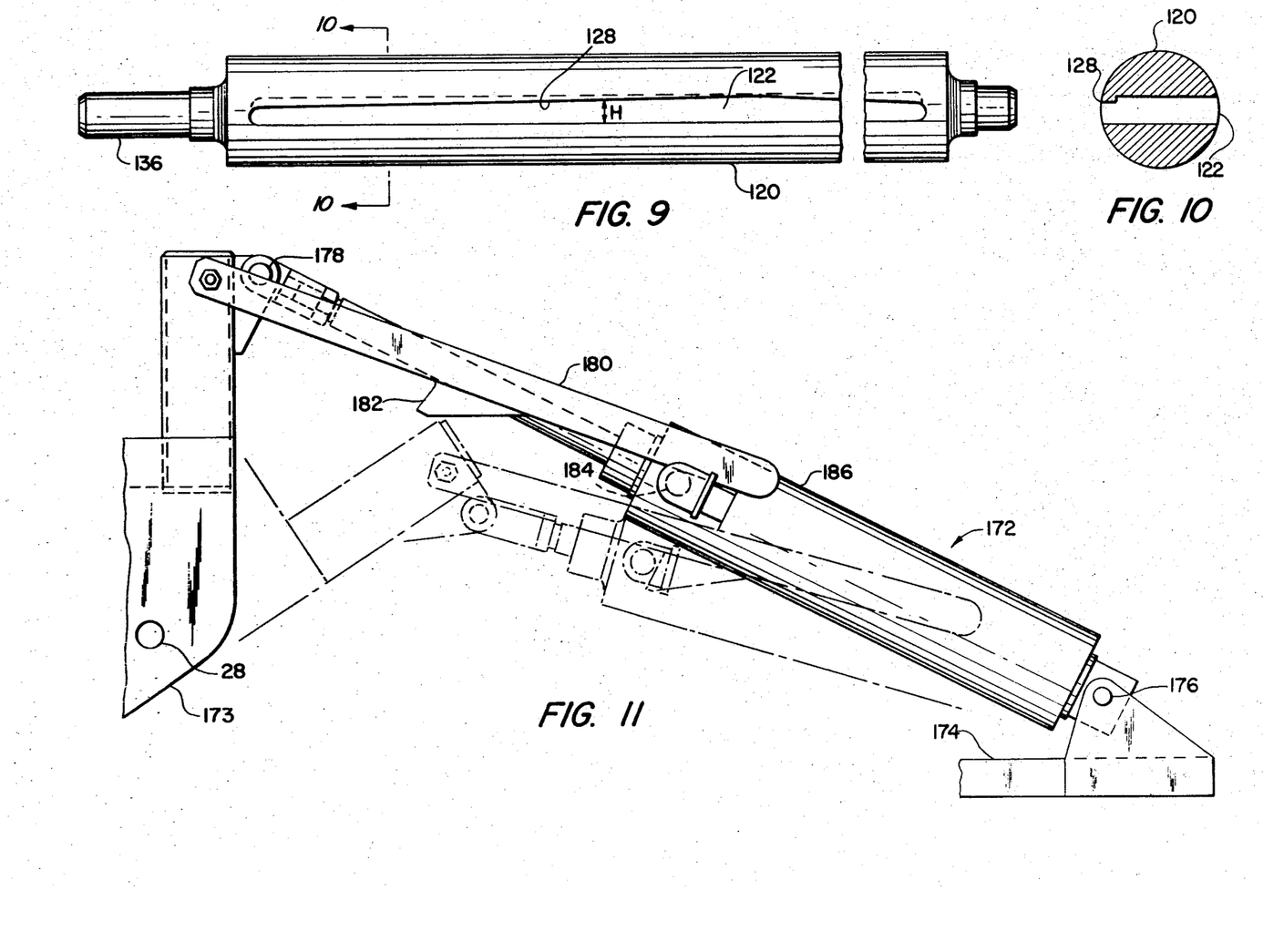
FIG. 9 is an elevation of a preferred embodiment of a cutter cylinder.
FIG. 10 is a section taken along line 10 of FIG. 9.
FIG. 11 is a schematic elevation that shows positioning means that can be used to position the bulk loader of FIGS. 3 and 4 relative to the frame of a feeder head of a vacuum packaging apparatus.

The paper supply apparatus includes a shearing means for cutting a web of paper into discrete lengths. As here embodied, and as illustrated in FIGS. 7 and 9, the shearing means comprises a cutter cylinder 120. A slot 122 in cylinder 120 extends diametrically across the cylinder to permit passage of a web 124 of paper through the cylinder. A spring-loaded shearing bar 126 is held in frictional contact with the exterior surface of cylinder 120, and cooperates with a cutting edge 128 on cylinder 120, to provide a shearing action that cuts the web 124 of paper into discrete lengths.

Drive means are provided for intermittently oscillating the cutting cylinder from an original position, in which slot 122 is aligned with the web 124 of paper fed by paper feeding means generally 130, through a small arc of rotation about its axis. This rotation permits cutting edge 128 and shearing bar edge 127 to shear web 124. Subsequently, the drive means rotates the cutting cylinder back to its original aligned position.

As schematically illustrated in FIG. 7, the cutting cylinder drive means comprises an air actuated cylinder 132 which is pivotally attached to the main frame assembly of the bulk loader by pin 131. The movable piston 135 of cylinder 132 is connected by a pin 133 to a crank arm 134 which has one end rigidly fixed to a shaft 136 extending from cutter cylinder 120 for rotation therewith. Shaft 136 is mounted on the main frame of the bulk loader for pivotal rotation relative to the frame. Air cylinder 132 can rapidly oscillate cutting cylinder 120 between the aligned position shown in FIG. 7, through a small cutting arc during its extension, and back through the small arc to the original position during retraction.

Paper supply means 130 are provided for feeding a web of paper to the shearing means. The supply means of FIG. 7 continuously feeds a web of paper to the shearing means. A pair of drive rollers 140 and 142 form a nip to pull a web of paper 124 from a supply roll 144. A take-up chamber, generally 146 is formed by an inner guide 148, that presents a convex surface on one side of web 124 and an outer guide 150, that presents a concave surface on the other side of web 124.

The concave surface of outer guide 150 adjacent to web 124 forms an accumulating path for web 124 during the cutting stroke when slot 122 is out of alignment with web 124, and guides the forward edge of web 124 back into the slot after the slot returns to its original position.

A paper outfeed means, generally 151, is provided to move the paper from the shearing means at a slightly faster linear rate of speed than the paper is moved by the paper supply means. This speed differential permits the outfeed means to take up the slack in the web produced during the time period that the slot in the cutting cylinder is out of alignment with the web.

As here embodied, and as illustrated in FIG. 7, the paper outfeed means includes a driven feed roller 152 and a spring-loaded guide plate 154 that forms a nip with feed roller 152. Feed roller 152 has a plurality of rigidly attached resilient rings 153 spaced across its length. Sheets of paper 155, illustrated in FIG. 4, fed by feed roller 152 are supported by spring-loaded gates 156 at the center edges and at the outer edges by channel pieces attached to gates 156, until a stripping operation takes place. Then, pressure exerted by the stripping head through the franks depresses gates 38 and gates 156 to a vertical position to permit the paper to move downwardly into the container.

Preferably, and as illustrated in FIG. 9, the height designated by H of slot 122 adjacent shearing bar 126 varies from a minimum at each end to a maximum at the midpoint of the length of the slot. This provides a cutting edge 128 on cutter cylinder 120 that tends to initially sever sheets 155 near their outside edges and then progressively cut towards the inside of the sheet. This progressive cutting provides a "scissors-type cut" and requires much less spring force to hold the shearing bar 126 against the cutting cylinder 120.

As best illustrated in FIG. 10, to facilitate machining, slot 122 is of uniform cross-section on the outfeed side of cutter cylinder 120. This uniform cross-section, which extends most of the distance through the cutting cylinder, allows the use of a larger cutter for this cut, then the tapered cut is made with a smaller cutter.

Functionally, the tapered cut could extend entirely through the cutting cylinder, but it would be difficult to make the cut with the small diameter cutter required.

Figure 8:
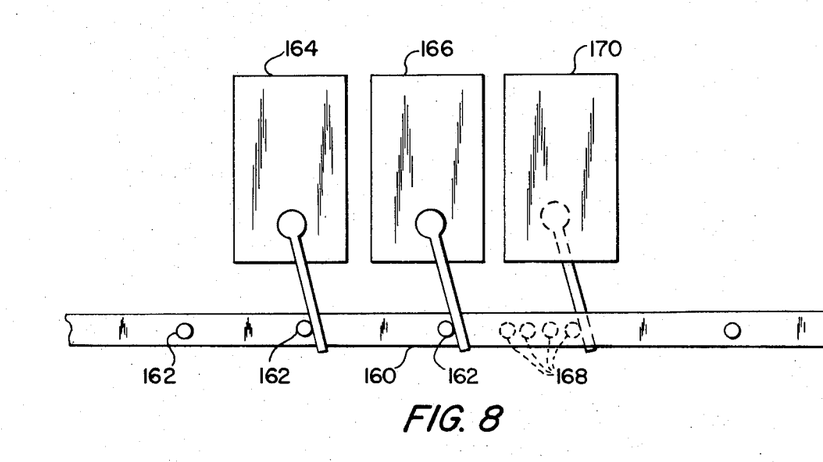
FIG. 8 is a schematic view of the timing chain utilized with the bulk loader illustrated in FIGS. 2–4.

The feeding means, the stripping means, the container conveyor, and the paper feeder and cutter system are synchronized by a timing chain 160 schematically illustrated in FIG. 8. The timing chain is driven by the same train that drives overhead conveyor 45 illustrated in FIG. 3. A plurality of spaced dogs 162 arranged in a repeating pattern project from one side of timing chain 160 and trip limit switches 164, 166. A plurality of spaced dogs 168, also arranged in a pattern, project from the other side of timing chain 160 and trip limit switch 170.

Figure 14:
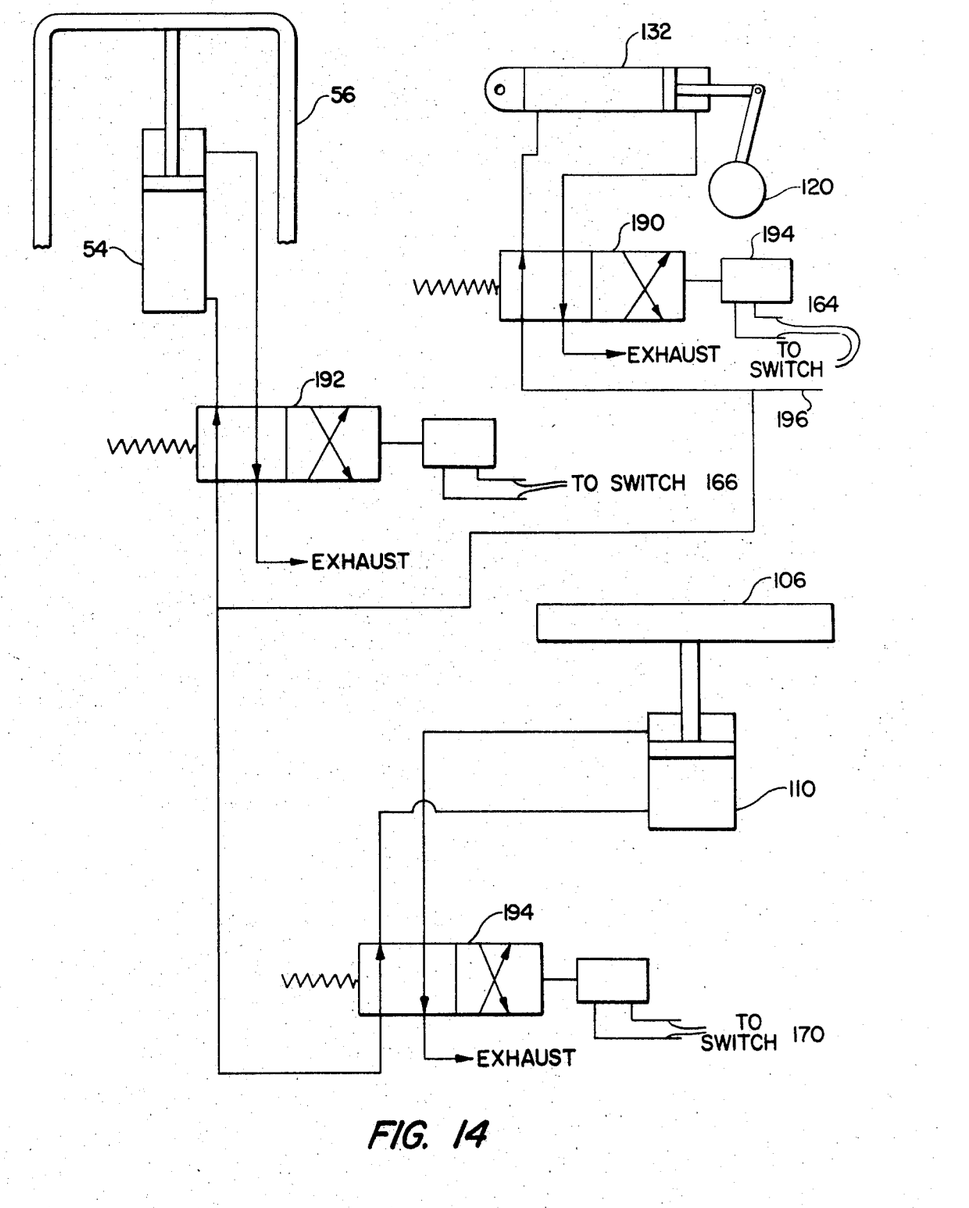
FIG. 14 is a schematic of an embodiment of pneumatic control means for controlling the operation of the bulk loader of FIGS. 3 and 4.

FIG. 14 schematically illustrates the pneumatic system used in conjunction with timing chain 160 and limit switches 164, 166 and 170 to synchronize (a) at the stripping operation, (b) the positioning of elevator means 100, and (c) the paper cutting operation with the frankfurter feeding operation.

Limit switches 164, 166, and 170, are electrically connected to solenoid valves 190, 192, and 194, respectively. Valves 190, 192, and 194 are all solenoid operated, four-way, spring return valves. When an electrical signal from one of the limit switches is received by a valve, the solenoid causes the valve to shift and reverses the air flow to the air cylinder. Then as soon as the electrical signal is interrupted, the spring returns the valve to its original position. In FIG. 14, all of the valves and cylinders are shown in the position they assume when the switches are open.

Air under pressure is supplied by supply line 196. Solenoid valve 194 controls the air supply to elevator cylinder 110, solenoid valve 192 controls the air supply to stripper cylinder 54, and solenoid valve 190 controls the air supply to paper cutter cylinder 132.

Limit switch 164 thus actuates air cylinder 132 that oscillates cutting cylinder 120 through a cutting stroke. Limit switch 166 actuates air cylinder 54 that reciprocates bars 56, connected to stripper head 52, along a vertical axis. Limit switch 170 actuates air cylinder 110 that raises and lowers support element 106. As illustrated in FIG. 8, a plurality of closely spaced pins 168 are provided on one side of timing chain 160 to keep switch 170 closed and thus hold support means 106 in its lower position for a time period sufficient to allow conveyors 34 to remove a loaded carton and move an empty carton into loading position.

FIG. 11 schematically illustrates an air cylinder 172 that is used for positioning the main frame 173 of the bulk loader relative to the main frame 174 of feeding head 12 of a vacuum packaging system. One end of air cylinder 172 is pivotally mounted on shaft 176 attached to main frame 174. The other end of air cylinder 172 is mounted on shaft 178 attached to bulk loader frame 173 for pivotal movement about the axis of shaft 178.

As previously described, the frame 173 of the bulk loader is pivotally mounted on shaft 28. Consequently, bulk loader frame 173 assumes the operative position illustrated by solid lines in FIG. 11 when air cylinder 172 is fully extended. Retraction of air cylinder 172 causes the bulk loader frame to pivot clockwise about the axis of shaft 28 through an arc to the inoperative position illustrated by phantom lines in FIG. 11.

A safety means is provided to prevent accidental movement of the bulk loader frame from the inoperative position to the operative position. A safety stop bar 180 is pivotally mounted at one end on the bulk loader frame. Stop bar 180 has welded thereon a catch plate 182 that contacts a bar 184 of circular cross-section rigidly attached to the cylinder 186 of air cylinder generally 172. Thus, catch plate 182 blocks unwanted extension of air cylinder 172, but can be manually pivoted out of the position shown in phantom lines in FIG. 11 to permit moving the bulk loader frame to the operative position.

The new bulk loader of this invention is designed to load frankfurters into cartons, either with or without interleaving paper between layers of frankfurters. In operation, the franks are initially fed, with reference to FIG. 1, by storage conveyor 18 and are automatically fed through collator 20, the inspection conveyor 14, into the feeding head 12, and then, into bulk loader 10. The franks are fed to bulk loader 10 in two rows and are loaded into the carton two rows at a time, either into a double row carton or else into two single row cartons simultaneously.

As shown in FIG. 2, carton conveyor 30 consists of two continuously running belts 34 and an elevator means that raises the carton off of the belts during the loading of the franks into the cartons. Two single row cartons 32 are in the loading position illustrated in FIG. 2. While these cartons are being loaded, the operator places two empty cartons onto moving belts 34. The moving belts hold the cartons against the end of the raised carton support element 106 of the elevator means. When the elevator means lowers the loaded cartons 32 onto the belts, the loaded and the empty carton move, with reference to FIG. 2, to the left on the belts 34 at the same time.

A spring-loaded carton stop arm 113, as illustrated in FIG. 4, is sufficiently spring-loaded to allow the loaded cartons 32 to push stop arm 113 down and permit the loaded cartons 32 to pass over it, but yet, stop arm 113 will stop the empty carton in the loading position. The elevator means then raises the empty cartons into loading position.

With reference to FIG. 3, the franks 8 are fed into stripping position by means of the pusher finger 48 on overhead conveyor 45, and are supported on the pivotally mounted spring-loaded gates 38 illustrated in FIG. 4. After a predetermined number of franks are collected onto gates 38, a stripping head 52 rapidly strips the two rows of franks into the cartons 32. As the stripping operation takes place, gates 38 are forced down to a substantially vertical position to hold the top edges of cartons 32 fully open to insure proper loading of the franks. The cartons are usually supplied in a folded condition and they tend to close up somewhat, so the carton spreading and holding function performed by gates 38 is important to the operation of the bulk loader.

With reference to FIG. 4, stripping head 52 is attached to and operated by air cylinder 54 by means of the connecting bars 56. The lower end of the stripping head 52 is guided by guide blocks with one guide block 58 illustrated in FIG. 4. As a layer of franks is being stripped into cartons 32, the leading frank of the next layer pushes against the forward element (brackets 74) of stripping head 52 and pivots brackets 74 to the left as viewed in FIGS. 3 and 5, and thereby allows the leading frank to keep moving continuously forward. It is impractical to stop the oncoming franks 8 during the stripping operation, hence the need for the movable forward portion of stripping head 52. As air cylinder 54 returns stripping head 52 to its upper position, brackets 74 rub lightly against the leading frank of the next group of franks. When stripping head 52 reaches its fully raised position, brackets 74 are returned to their normal position, as shown in FIG. 5 by spring 84, and are ready to strip the next layer of franks when cylinder 54 again urges stripping head 52 downwardly.

A length of interleaving paper cut from web 124 is simultaneously fed below a layer of franks as the franks are collected on gates 38. The length of paper is supported by gates 156.

The paper feeder and cutter system is provided to feed and cut interleaving paper for separating the layers of franks in the cartons. In operation, the mechanism feeds paper continuously from one or two rolls of paper, cuts the paper to length, and then feeds the paper in a position below the franks where it is stripped into the cartons along with each layer of franks.

With reference to FIG. 7, cutter cylinder 120 is slotted and web 124 of paper is fed to initially pass through slot 122. At the appropriate time, cutter cylinder 120 is rapidly oscillated by air cylinder 132 to cut the paper as the cutting edge 128 of cutter cylinder 120 contacts the cutting edge 127 of shearing bar 126. Cutter cylinder 120 then very rapidly returns to its original position as shown in FIG. 7. During the cutting and return oscillations of cutter cylinder 120, the infeeding paper web 124 is momentarily blocked. During this blocked period, the constantly moving paper moves toward the concave inner wall of outer guide 150.

At the end of the blocked period, the cut leading edge of the paper, due to the continuous feeding action of rolls 140 and 142, is then pushed upwardly through slot 122 and into engagement with feed roller 152 which pushes the paper onto gates 156 and into the stripping position. Feed roller 152 runs approximately ten percent faster than feed rollers 140 and 142. When the leading end of web 124 reaches feed roller 152, the speed differential starts to take up the slack in the paper in chamber 146 and draws the paper tightly against the convex inner surface of inner guide 148. After the slack in the paper has been removed a slight slippage of the paper occurs at roller 152.

With reference to FIG. 4, when a layer of franks is stripped into cartons 32, gates 38 are forced down into the cartons to hold the upper sides of the cartons fully open. Therefore, as the last layer of franks is loading into the carton, air cylinder 110 has moved support element 106 downwardly to an intermediate position, about 1 inch from its fully raised position. In this intermediate position, the last layer of franks is stripped clear of the gates 38. If the support element remained at its fully raised position during the stripping of the last layer of franks, the franks would be pinched between spring-loaded gates 38 and would hang up between the gates as cartons 32 are lowered onto belts 34 for discharging from the bulk loader.

Various modifications of the structure illustrated in the drawings and described in this specification will be apparent to those skilled in the art. Such modifications and changes may be made in the structural details of the apparatus without departing from the claimed scope of the invention.

What is claimed is:

1. A bulk loader for packaging a plurality of sausages in a container having side walls comprising:
  a. support means for supporting a group of sausages;
  b. container support means, positioned below said support means, for supporting the container;
  c. feeder means for advancing sausages onto said support means;
  d. stripping means mounted for stripping movement relative to said support means for intermittently moving a group of sausages from said support means into the container;
  e. shearing means for cutting a web of paper into discrete lengths;
  f. supply means for feeding a web of paper to the shearing means; and
  g. paper outfeed means for feeding a discrete length of paper from said shearing means along each group of sausages deposited on the support means to permit simultaneous movement of the discrete length of paper and the group of sausages into the container by said stripping means.

2. The bulk loader of claim 1 including a control means for (a) sensing when said feeder means has advanced a desired number of sausages onto said support means, and (b) activating said stripping means and said shearing means in timed relation to the accumulation of the desired number of sausages on said support means.

3. The bulk loader of claim 2 in which said container support means includes elevator means for elevating the carton to a loading position, and said elevator means comprises a carton support element and elevator control means for raising and lowering said carton support element, said elevator control means including sensing means for sensing when a given number of layers of sausages has been deposited in the container and transmitting an activating signal in response thereto, and (b) pneumatic means for lowering said carton support element in response to the activating signal of said sensing means.

4. The bulk loader of claim 1 in which said stripping means includes a stripping head mounted for reciprocation relative to said support means; and said stripping head includes a deflectable forward portion adjacent said feeder means that can be deflected out of the path of sausages being advanced by said feeder means.

5. The bulk loader of claim 4 in which said container support means includes conveyor means for removing the container from the bulk loader.

6. The bulk loader of claim 1 in which said container support means includes elevator means for elevating the container into a loading position, and said elevator means comprises a container support element and control means for raising said container support element to an upper position for loading, and for lowering said container support element from said upper position.

7. The bulk loader of claim 6, for use with a flexible container including side walls, in which:
 a. said support means comprises a plurality of pivotally mounted gates, and deflectable means connected to said gates for permitting said gates to open due to the pressure exerted on said gates through a group of sausages by said stripping means, said deflectable means being resilient for closing said gates at the end of a stripping operation;
 b. said container support means support the container in a loading position in which said gates contact the inside surface of the side walls of the container during the stripping operation to hold the container open; and
 c. said control means position and said carton support element in a partially lowered position at the time of deposition of the top layer of sausages in the carton to permit said gates to pivot to their closed position without disrupting the top layer of sausages.

8. The bulk loader of claim 7 in which said container support means includes an endless conveyor means.

9. The bulk loader of claim 1 in which:
 a. said container support means includes conveyor means for removing the container from the bulk loader;
 b. said container support means further includes elevator means including a container support element having a discontinuous upper surface formed by a pair of spaced members, with said conveyor means extending between the spaced members that form said upper surface; and control means for raising and lowering said carton support element between an upper position in which said carton support element supports the container for loading, and a lower position in which the container is supported by the conveyor means; and
 c. resilient container stop means for preventing movement of an empty container along the conveyor means.

10. The bulk loader of claim 9 in which said feeder means moves sausages along a given path, the stripping movement of said stripping means intersects the given path, and said stripping means includes a stripping head mounted for reciprocation relative to said support means; and said stripping head includes a forward portion adjacent said feeder means that can be deflected out of the given path by advancing sausages.

11. The bulk loader of claim 10 in which said stripping head comprises a stripper plate mounted for reciprocation relative to said support means, a forward stripping element pivotally mounted on said stripper plate, and resilient means connected to said forward stripping element for aligning said stripper plate and said forward stripping element during the initial phase of a stripping operation and permitting said forward stripping element to pivot out of the given path when contacted by sausages advanced by said feeding means.

12. The bulk loader of claim 11 in which said support means comprises a plurality of pivotally mounted gates, and deflectable means connected to said gates for permitting said gates to open due to the pressure exerted on said gates through a group of sausages by said stripping means, said deflectable means being resilient for closing said gates at the end of a stripping operation.

13. The bulk loader of claim 1, in which said shearing means includes (i) a cutting cylinder containing a slot that permits passage of the web of paper therethrough, with one edge of said slot being a cutting edge; (ii) a shearing bar held in frictional contact with the exterior surface of said cylinder; and (iii) cutting cylinder drive means for intermittently oscillating said cylinder from an original position, in which said slot is aligned with the web of paper fed by said supply means, through an arc that permits said cutting edge and said shearing bar to shear the web of paper, and back to its original aligned position.

14. The bulk loader of claim 13 in which said supply means continuously feeds the web of paper to the shearing means and said supply means includes a take-up chamber having a convex surface on one side of the web that forms a path for the web when said slot is aligned with the web, and a concave surface on the other side of the web that forms a restraining path for the web when said slot is out of alignment with the web, said concave surface guiding said web into said slot after said slot returns to its original aligned position.

15. The bulk loader of claim 14 in which said paper outfeed means moves the paper at a faster linear rate of speed than said supply means and thus takes up the slack in the web produced during the time period said slot is out of alignment with the web.

16. The bulk loader of claim 15 in which said paper outfeed means comprises a driven feed roller and a spring-loaded guide plate that forms a nip with said feed roller.

17. The bulk loader of claim 13 in which the height of the slot in said cutting cylinder varies along its length to provide a cutting edge that progressively shears various portions of said web to completely shear across the entire web.

18. The bulk loader of claim 1 in which said container support means advances a container to a loading zone and removes the container from the loading zone in sequence with a loading operation, and comprises:
 a. a frame;
 b. elevator means mounted on said frame, said elevator means including a container support element formed by spaced parallel members that present a discontinuous support surface, and control means for raising and lowering said container support element relative to said frame in timed sequence with a loading operation;
 c. An endless conveyor means mounted on said frame and having its upper reach projecting slightly above and passing through said spaced parallel members of said discontinuous support surface when said container support element is in a lowered position; and d. a resilient container stop means projecting above the plane of the upper reach of said conveyor means for preventing movement of an empty container on said endless conveyor means.

19. A bulk loader for (a) receiving sausages from the upper reach of a lower sausage conveyor which conveys sausages with the sausages parallel to each other and with their ends substantially aligned, (b) loading the sausages received from the sausage conveyor into a container, and (c) interleaving sheets of paper between layers of sausages, said bulk loader comprising:

a. support means comprising spring-loaded gates for supporting a group of sausages;
b. container support means, positioned below said support means, for supporting the container;
c. feeder means for advancing groups of sausages onto said support means, said feeder means comprising (i) cantilevered arms for receiving sausages, from said lower sausage conveyor and supporting the sausages during movement of sausages to said support means, and (ii) an endless upper conveyor positioned above said cantilevered arms and synchronized with said lower sausage conveyor, said endless upper conveyor having laterally aligned and laterally spaced fingers projecting outwardly therefrom, the lower reach of said endless upper conveyor located above the upper reach of said lower sausage conveyor and extending past said upper reach in the direction of movement of the upper reach of the sausage conveyor;
d. stripping means mounted for stripping movement relative to said support means for intermittently moving a group of sausages from said support means into the container;
e. shearing means for cutting a web of paper into discrete lengths;
f. supply means for feeding a web of paper to the shearing means; and
g. paper outfeed means for feeding a discrete length of paper from said shearing means along each group of sausages deposited on the support means to permit simultaneous movement of the discrete length of paper and the group of sausages into the container by said stripping means.

20. The bulk loader of claim 19 in which (a) said bulk loader includes a bulk loader frame pivotally mounted on the frame of said sausage conveyor for movement about an axis located above the upper reach of said lower sausage conveyor; and (b) said support means, said feeder means, and said stripping means are all mounted on said bulk loader frame.

21. The bulk loader of claim 20 including positioning means attached to said bulk loader frame for moving said support means, said feeder means and said stripping means between an operating position in which said feeder means engage sausages on said lower sausages conveyor, and an inoperative position in which said feeder means do not engage the sausages on said lower sausage conveyor.

* * * * *